Oct. 11, 1960     W. HRYNISZAK     2,955,424
GAS TURBINE PLANTS
Filed Nov. 1, 1955

United States Patent Office 2,955,424
Patented Oct. 11, 1960

2,955,424
GAS TURBINE PLANTS

Waldemar Hryniszak, Newcastle-upon-Tyne, England, assignor to C. A. Parsons & Company Limited, Newcastle-upon-Tyne, England Filed Nov. 1, 1955, Ser. No. 544,261

Claims priority, application Great Britain Nov. 8, 1954

8 Claims. (Cl. 60—39.29)

This invention relates to gas turbine plants especially those plants suitable for vehicle propulsion.

It is known that certain properties of a gas turbine plant such for instance as its torque behaviour can be improved by having two turbines mechanically independent of each other, one turbine driving a compressor whilst the other provides the output available for use externally of the plant.

The disadvantages of the use of two turbines are well known. In most cases the number of stages is limited to two and this limits the maximum value of temperature and pressure and therefore the efficiency. This not only limits the output, but has the additional disadvantage that, vibrations are set up which limit the minimum permissible clearance between the nozzle and blade tips and the rotor and stator surface and often result in comparatively low efficiencies. The construction of the bearings is also affected.

Where the gas turbine is used for driving locomotives, road vehicles and the like, a good positive torque behaviour resulting from the use of two turbines is obtained. The disadvantage of such a turbine arrangement is, however, the absence of a negative torque when braking the vehicle. To overcome this disadvantage a very elaborate arrangement including gears and clutches is necessary to enable the two turbines to be coupled mechanically during the time when such braking is necessary.

The object of the present invention is to provide a gas turbine plant where a good positive and negative torque behaviour are obtained without the use of two separate turbines.

The invention consists in a gas turbine plant comprising compression means and a turbine, said compression means comprising two compressors, namely a high pressure compressor and a low pressure compressor one of which is coupled directly to the turbine shaft whilst the other is coupled to the turbine shaft through an epicyclic differential gear which drives an output shaft.

The invention also consists in gas turbine plants in accordance with claims 2 to 8 below.

Referring to the accompanying diagrammatic drawings.

Figure 1:
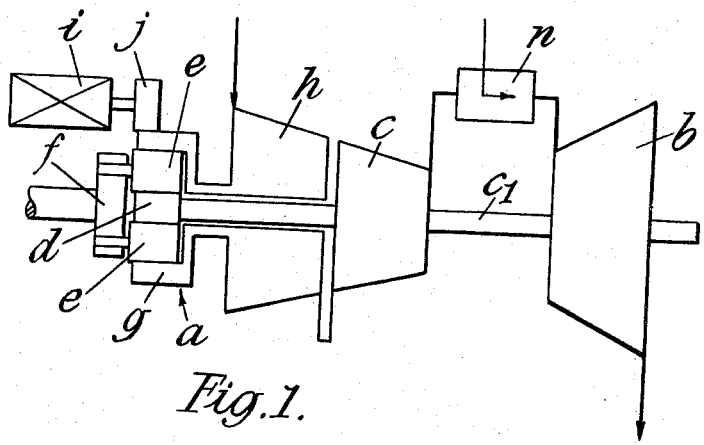
Figure 1 illustrates one form of the present invention in which a high pressure elastic fluid compressor is driven directly by a gas turbine and a low pressure compressor indirectly through an epicyclic gear.

In carrying the invention into effect in the form illustrated with reference to Figure 1 a high pressure compressor is driven directly by the turbine and a low pressure compressor is driven indirectly through an epicyclic differential gear indicated as a whole by the reference letter $a$.

By epicyclic differential gear we mean a gear which has one input shaft and two output shafts the output shafts being capable of rotation at different speeds, but such that should the speed of one shaft fall the other rises. A turbine $b$ drives a high pressure compressor $c$, by means of a shaft $c_1$ which is common to the rotors of the turbine $b$ and compressor $c$ respectively and which terminates in a pinion $d$ of the epicyclic gear $a$. Planet wheels $e$ of the epicyclic gear are connected by a carrier $f$ with the output shaft of the gas turbine unit. Ring gear $g$ of the gear $a$ is connected directly in the form shown with low pressure compressor $h$. The gas turbine unit can be started by a starting motor $i$ driving the ring gear $g$ through a pinion $j$.

Figure 2:
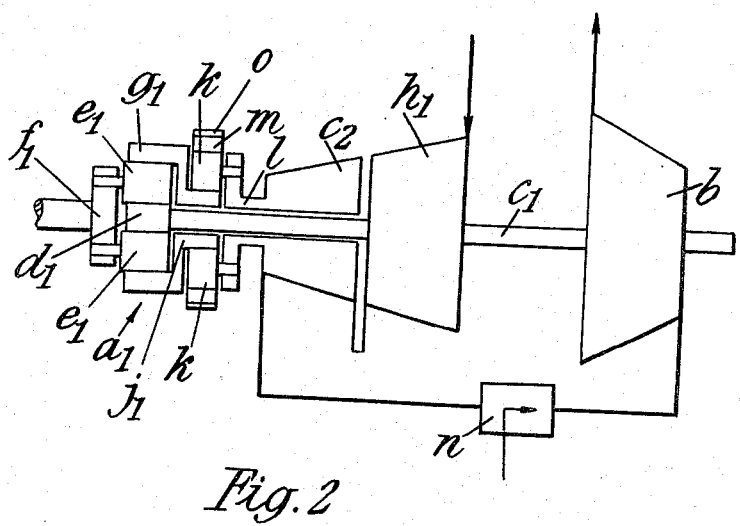
Figure 2 illustrates one form of the present invention in which a gas turbine drives a low pressure elastic fluid compressor directly, and a high pressure compressor is driven by the turbine through an epicyclic gear.

Referring now to Figure 2 the turbine $b$ drives the low pressure compressor $h_1$, the common shaft $c_1$ of the two rotors again terminating in a pinion $d_1$ of an epicyclic gear $a_1$. Planet wheels $e_1$ rotate their carrier $f_1$ and hence the output shaft. The sun wheel $g_1$ of this first train of epicyclic gears is connected by a pinion $j_1$ with another set of planet wheels $k$ which are connected in their turn with their carrier $l$ and hence with the high pressure compressor $c_2$. Planet wheels $k$ also engage a second sun wheel $m$.

Both figures also illustrate the connection of a combustion chamber $n$.

With the epicyclic gear trains of Figure 2 may be employed brakes or clutches or other means $o$ associated with sun wheel $m$ to produce different effects as regards the speed of the high pressure compressor $c_2$. In this case sun wheel $m$ would be free to rotate but could be prevented from rotating by application of the brake $o$.

Both compressors may be of the axial or the radial type, or one of them may be axial and the other radial. In many cases it will be advisable to make the pressure ratio of the indirectly driven part of the compressor smaller than that of the directly driven part.

In the application of such gas turbine units for vehicle propulsion the bulk of the compression would be carried out in the compressor driven directly by the turbine and the speed of the indirectly driven compressor would be relatively low.

Under normal running conditions therefore the plant would operate substantially as a unit having a single compressor directly coupled to the gas turbine.

With increased load on the output shaft, for example as the vehicle goes uphill, the indirectly coupled compressor will speed up and increase the pressure ratio and hence the output of the plant.

For braking the fuel would be shut off or considerably reduced and the compressors would assist in the braking of the turbine.

What I claim is:

1. In a land vehicle, a gas turbine plant comprising compression means, a turbine shaft, a turbine and a vehicle propelling shaft, said compression means comprising two compressors namely a high pressure compressor and a low pressure compressor, means coupling one said compressor directly to the turbine shaft, and a differential gear having a gear element connected to the turbine shaft for driving thereby, a gear element connected to and driving the other said compressor and a third gear element connected to and driving the said vehicle propelling shaft.

2. A gas turbine plant as claimed in claim 1, in which the compressors are of the rotary type and the compressors and turbine are arranged co-axially, one compressor and the turbine being on a common shaft whilst the other compressor has a hollow shaft surrounding the said common shaft and an epicyclic gear arrangement connecting the said hollow shaft to the said common shaft.

3. A gas turbine plant as claimed in claim 1 in which the high pressure compressor is coupled directly to the turbine shaft.

4. A gas turbine plant as claimed in claim 3, in which the low pressure compressor is coupled to a ring gear which engages planetary gears which in turn engage a pinion on the turbine shaft, said planetary gears being carried by a carrier which is coupled to the output shaft.

5. A gas turbine plant as claimed in claim 1, in which the low pressure compressor is coupled directly to the turbine.

6. A gas turbine plant as claimed in claim 5, in which the high pressure compressor is coupled to a carrier carrying planetary gears which engage a first ring gear and a pinion, said pinion being attached to a second ring gear which second ring gear is engaged by further planetary gears which in turn engage a pinion attached to the turbine shaft, said further planetary gears being carried by a carrier fixed to the output shaft.

7. A gas turbine plant as claimed in claim 6, in which means are provided for preventing rotation of said first ring gear.

8. A vehicle gas turbine plant comprising a turbine, a turbine shaft, a main compressor directly coupled to the turbine shaft so as to rotate at the same speed, an auxiliary compressor, a differential gear having an input shaft driven by the turbine shaft to rotate at the same speed as said shaft, and two output shafts, one output shaft driving said auxiliary compressor and the other output shaft driving a further shaft for propelling the vehicle, the gear ratio being such that under normal running conditions the auxiliary compressor rotates at a speed substantially less than the main compressor but such that when the said further shaft is braked the speed of the auxiliary compressor increases to supplement the main compressor.

References Cited in the file of this patent

UNITED STATES PATENTS

| | | |
|---|---|---|
| 1,732,405 | Ivernizzi | Oct. 22, 1929 |
| 2,540,991 | Price | Feb. 6, 1951 |
| 2,575,683 | Price | Nov. 20, 1951 |
| 2,613,749 | Price | Oct. 14, 1952 |
| 2,693,080 | Hutchinson | Nov. 2, 1954 |

FOREIGN PATENTS

| | | |
|---|---|---|
| 860,901 | Germany | Dec. 29, 1952 |
| 868,809 | Germany | Feb. 26, 1953 |
| 595,357 | Great Britain | Dec. 3, 1947 |
| 610,939 | Great Britain | Oct. 22, 1948 |